Oct. 5, 1965  J. A. VAN BERGEN ETAL  3,210,521
TORCH FOR ARC WELDING
Filed Nov. 5, 1962
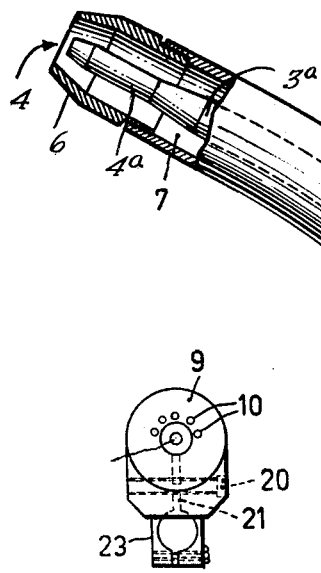
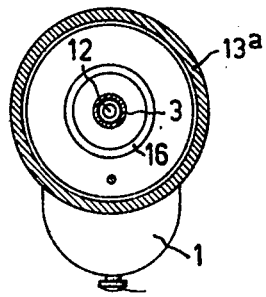
FIG.2
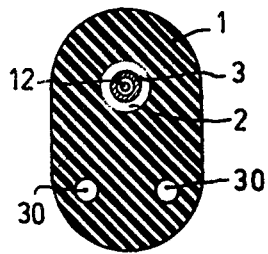
FIG.3
FIG.4
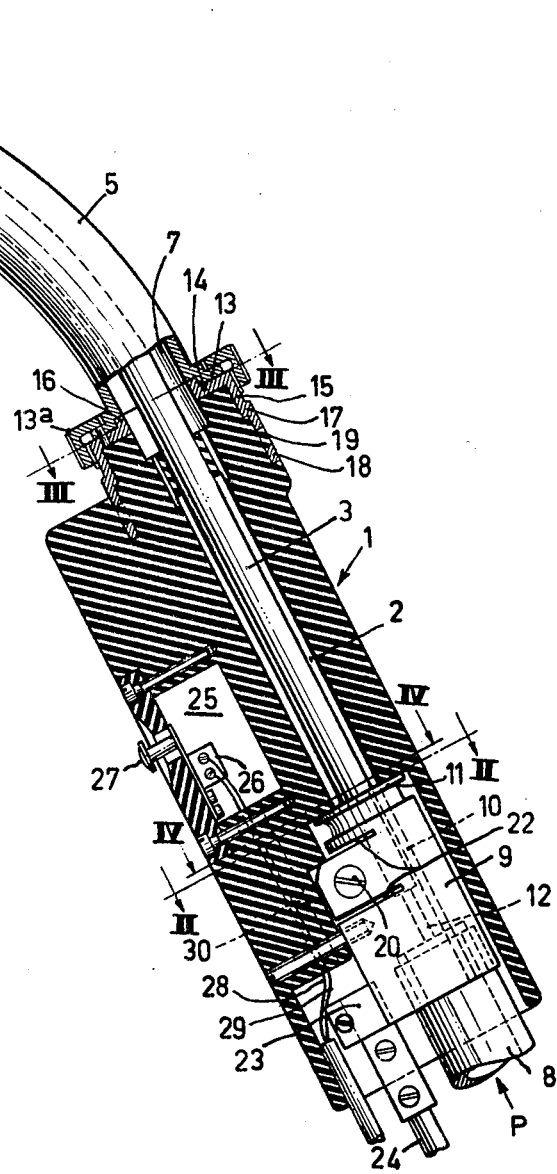
FIG.1
INVENTOR
JAN A. VAN BERGEN
HENRICUS J. STROEKEN
BY
AGENT United States Patent Office 3,210,521
Patented Oct. 5, 1965

3,210,521
TORCH FOR ARC WELDING
Jan Anthonie van Bergen and Henricus Joseph Stroeken, Emmasingel, Eindhoven, Netherlands, assignors to North American Philips Company, Inc., New York, N.Y., a corporation of Delaware
Filed Nov. 5, 1962, Ser. No. 235,490
Claims priority, application Netherlands, Nov. 24, 1961, 271,797
4 Claims. (Cl. 219—130)

This invention relates to arc-welding torches without water cooling, comprising a housing of electrically and heat-insulating material having a longitudinal duct for the passage of a protective gas and a tube for guiding a consumable wire-shaped or band-shaped welding electrode driven outside the torch, said tube projecting from one extremity of the housing and being surrounded there by a duct having a nozzle at its free end and its other end connected to a separator between the duct and said extremity of the housing, which separator consists of metal of poor thermal conductivity.

An arc-welding torch according to the invention is especially intended for welding with protective gas in the form of carbon dioxide or gas mixtures containing carbon dioxide.

A known arc-weldng torch is in the form of a comparatively heavy gun of robust dimensions.

An object of the invention is to provide a structure of an arc-welding torch which is light in weight and lies easily in the hand and has limited dimensions so that welding areas can be reached which are difficult of access, whilst the housing to be gripped remains reasonably cool despite its small dimensions and has a satisfactory life-length.

The present invention is based upon recognition of the fact, that special attention must be paid to the transition area between the heat-insulating separator and the housing and that it is then possible to transmit so little heat to the housing of the torch that this housing may have a very limited size, in other words need no longer be a robust gun, but only a simple tubular body which also forms the handle of the torch and also contains the switch required.

A first important step taken at the transition area between separator and housing is that the separator is not inserted or screwed into the extremity of the housing, but surrounds it at least for the greater part.

Another useful step carried out in an embodiment according to the invention is to provide in the sleeve-shaped separator a plurality of radial apertures which are filled with material of the housing brought into the apertures and into the sleeve, for example by the extrusion process.

This results in a rigid connection between sleeve and housing, which is favourable with regard to the transmission of heat to the material of the housing.

In another advantageous embodiment of the invention, a collar made from the material of the housing is provided in the housing near the sleeve, said collar accommodating or guiding the electrode guide tube and also comprising apertures for the passage of protective gas.

As a result of this step the relevant transition area between separator and housing is satisfactorily cooled by the protective gas flowing along it.

In this well-considered structure it is possible for the temperature of the housing to be maintained at about 35° C. during welding, the temperature of the gas outflow nozzle then being about 240° C.

The duct leading to this nozzle and surrounding the guide tube for the welding electrode need not even be provided with projecting cooling fins, which is again beneficial to the compactness of the torch and the accessibility of welding areas which are difficult to reach.

According to the invention, the separator is in the form of a sleeve which largely surrounds the relevant extremity of the housing, and the housing is in the form of a cylindrical body which also forms a handle and which has a chamber recessed in it containing a switch.

In order that the invention may be readily carried into effect, it will now be described in detail, by way of example, with reference to the accompanying diagrammatic drawing, in which:

FIGURE 1 shows a longitudinal section through a welding-arc torch according to the invention;

FIGURE 2 is an end view of a current connecting terminal, as viewed in the direction indicated by the arrows II—II of FIGURE 1;

FIGURE 3 is an end view of the separator between the gas duct and the housing, as viewed in the direction indicated by the arrows III—III of FIGURE 1;

FIGURE 4 shows a cross-section of the housing, taken along the line IV—IV of FIGURE 1.

The torch according to the embodiment shown comprises a housing 1, which is made by the extrusion process from polyester synthetic material armoured with fibres, for example glass fibres. The housing is a cylindrical body of a cross-sectional shape as shown in FIGURE 4, which conveniently lies in the hand. It has a bore 2 for the passage of a tube 3 which internally serves as a guide for a wire-shaped welding electrode supplied through a hollow flexible tube in the direction indicated by arrow $p$, which electrode leaves, at 4, a nozzle $4a$ on tube 3 and may be melted shortly beyond said nozzle by drawing an arc between the end of the wire and a work-piece.

A duct 5 having a nozzle 6 surrounds the portion $3a$ of tube 3 projecting from the housing 1. The duct 5, like tube 3, is made of material of good thermal conductivity, such as a copper alloy. Between the duct 5 and the tube $3a$ there is formed a channel 7 of annular cross-section to which protective gas from a supply pipe 8 may be supplied through a current supply terminal 9 and apertures 10 provided in a collar 11 on the housing and which gas thus flows along the nozzle $4a$ out of the nozzle 6.

The terminal 9 is provided with bores 12.

That end of duct 5 which is remote from the nozzle 6 has a flange 13 which is secured by means of a milled nut $13a$ to an annular portion 14 of a sleeve-shaped separator 15 arranged between the duct 5 and the housing 1.

The ring 14 is externally threaded and has an annular collar 16 which fits into a recess of flange 13.

Ring 14 is joined by a short sleeve-shaped part 17 to a ring 18 having radial apertures 19. Ring 18 surrounds the terminal portion of the housing 1. The apertures 19 are filled with the material of the housing 1 during the extrusion thereof.

The parts 16, 14, 17 and 18 constitute together a single component part, that is to say the separator 15, which is made from a metal having a poor thermal conductivity, for example high-quality steel, such as steel with 17% of chromium and 8% of nickel, which may be well chipped. This simple separator 15, arranged in the manner described, has been found to form a sufficient heat barrier between the duct 5 and the housing 1. Measurements have shown that the temperature of nozzle 6 during welding was about 240° C., and that of the housing only 35° C., a temperature fall of about 25° C. taking place through the separator 15. The extremity 1A of the housing is then cooled by protective gas flowing through the apertures 10 in collar 11. The terminal 9 is in the form of a rigid piece of brass (see also FIGURE 2) which is clamped in position on tube 3 by means of a screw 20. To enhance the clamping effect, slots 21 and 22 are provided in the clamping body 9. The latter is also provided with a sleeve 23 for attachment of a current cable 24.

A chamber 25 containing a switch 26 with a push button 27 is recessed in the simple cylindrical housing 1. The switch 26 governs through leads 28, 29, the supply of gas and wire.

The leads 28, 29 extend through a bore 30 in the housing 1 (see FIGURES 1 and 4).

What is claimed is:

1. A non-liquid cooled arc-welding torch comprising, an elongated handle of electrical and heat insulating material having a longitudinal duct therethrough, a sleeve like separator constructed of metal having poor thermal conductivity surrounding one end of said handle and partially embedded therein, an external protective duct having a flange at one end in intimate engaging contact with said separator only, means securing said flanged end to said separator, and means positioned within the longitudinal duct through the handle and said external protective duct for guiding a welding electrode.

2. An arc-welding torch as set forth in claim 1 in which the embedded portion of the separator includes a plurality of circumferentially disposed apertures through the sleeve wall and through which apertures the handle material extends.

3. An arc-welding torch as set forth in claim 1 in which the means for guiding the welding electrode is supported within the longitudinal duct through the handle in the vicinity of the separator by a collar made of the same material as the handle which engages the longitudinal duct and the guide means and through which, in the direction of electrode movement, are provided a plurality of apertures for permitting the passage of fluids between the longitudinal duct through the handle and the external protective duct attached to the separator.

4. An arc-welding torch as set forth in claim 2 in which the means for guiding the welding electrode is supported within the longitudinal duct through the handle in the vicinity of the separator by a collar made of the same material as the handle which engages the longitudinal duct and the guide means and through which, in the direction of electrode movement, are provided a plurality of apertures for permitting the passage of fluids between the longitudinal duct through the handle and the external protective duct attached to the separator.

References Cited by the Examiner

UNITED STATES PATENTS 2,881,305   4/59   Wojciak et al. _____ 219—130

RICHARD M. WOOD, *Primary Examiner.*